(12) United States Patent
Genty et al.

(10) Patent No.: US 7,159,242 B2
(45) Date of Patent: Jan. 2, 2007

(54) SECURE IPSEC TUNNELS WITH A BACKGROUND SYSTEM ACCESSIBLE VIA A GATEWAY IMPLEMENTING NAT

(75) Inventors: Denise Marie Genty, Austin, TX (US); James Stanley Tesauro, Austin, TX (US); Ramachandran Unnikrishnan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 931 days.

(21) Appl. No.: 10/142,608

(22) Filed: May 9, 2002

(65) Prior Publication Data

US 2003/0212907 A1 Nov. 13, 2003

(51) Int. Cl.
H04L 9/00 (2006.01)
(52) U.S. Cl. ............................. 726/14; 726/3; 726/15; 713/150; 713/160; 713/161; 713/168; 709/220; 709/225; 709/229
(58) Field of Classification Search .................... None
See application file for complete search history.

(56) References Cited

U.S. PATENT DOCUMENTS

| | | | | |
|---|---|---|---|---|
| 6,631,416 B1 * | 10/2003 | Bendinelli et al. | .......... | 709/227 |
| 6,826,684 B1 * | 11/2004 | Fink et al. | ................... | 713/160 |
| 6,886,103 B1 * | 4/2005 | Brustoloni et al. | ............ | 726/15 |
| 6,944,183 B1 * | 9/2005 | Iyer et al. | ..................... | 370/466 |
| 6,996,628 B1 * | 2/2006 | Keane et al. | ................ | 709/238 |
| 2002/0010866 A1 * | 1/2002 | McCullough et al. | ........ | 713/201 |
| 2002/0016926 A1 * | 2/2002 | Nguyen et al. | ............. | 713/201 |
| 2002/0023210 A1 * | 2/2002 | Tuomenoksa et al. | ...... | 713/161 |
| 2002/0046348 A1 * | 4/2002 | Brustoloni | ................... | 713/201 |

OTHER PUBLICATIONS

Mukundan, D., et al, 'Implementation of IPSEC-NAT compatibility with UDP encapsulation of IPSEC packets', Dept. EE & CS, Univ. of Kansas, 2001, entire document, http://www.ittc.ku.edu/~kpm/ipsec_udp_encap/.*

* cited by examiner

Primary Examiner—Nasser Moazzami
Assistant Examiner—Ronald Baum
(74) Attorney, Agent, or Firm—Casimer K. Salys; Dillon & Yudell LLP

(57) ABSTRACT

A method and system for enabling secure IPsec tunnels within NAT without compromising security. A local network is configured with a gateway machine connected to the Internet and having an IPsec ID for interfacing with the Internet and a local IP/interface address for interfacing with the local network. Client machines are connected to the gateway machine and communicate with the Internet via the gateway and network address translation (NAT) techniques. Each client machine is configured with a local IP/interface address. The client machines are also provided with an alias of the IPsec ID for the gateway machine. When an IPsec request is received by the gateway machine to establish a tunnel (secure communication) with one of the clients, the gateway machine forwards the packet to the particular client using NAT. The client machine receives the request and since it has an alias of the gateway's IPsec ID, the client machine will confirm that it has one of the IPsec IDs in the packet. The client machine sends the reply packet back to the gateway machine, which then forwards it to the requesting machine over the Internet. The requesting machine receives the packet and a confirmation that it has reached its intended recipient and opens the secure IKE tunnel with the particular client via the gateway machine. In this manner authentication of the IKE tunnel and establishment of a secure IPsec session is completed with a client machine that is accessible only via a gateway implementing NAT.

25 Claims, 3 Drawing Sheets

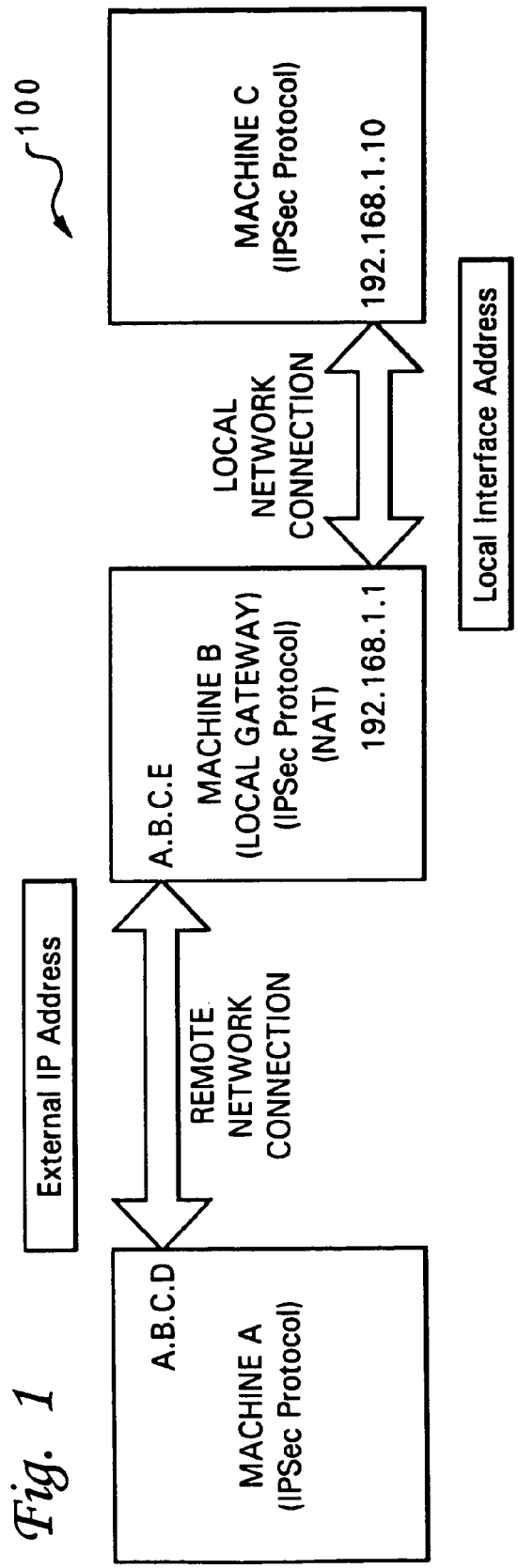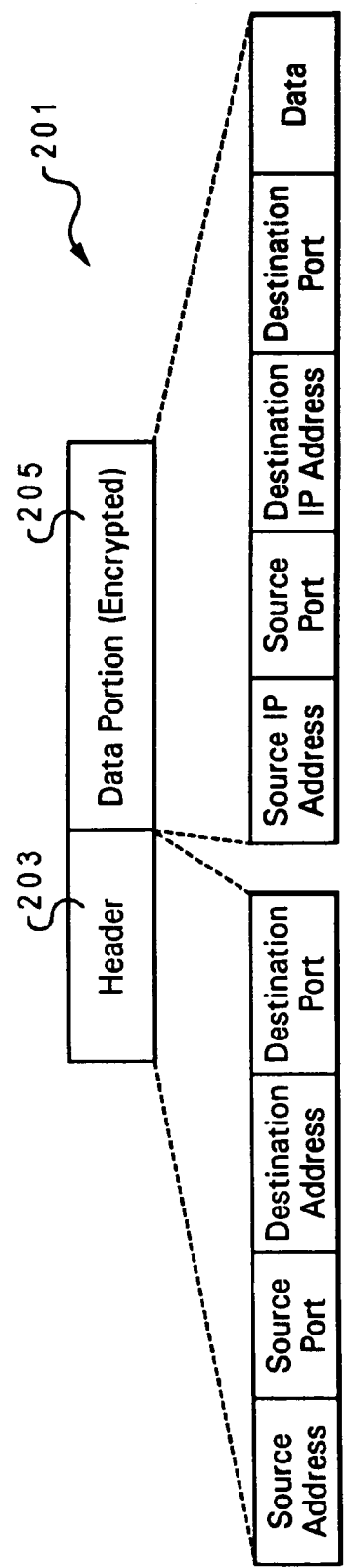

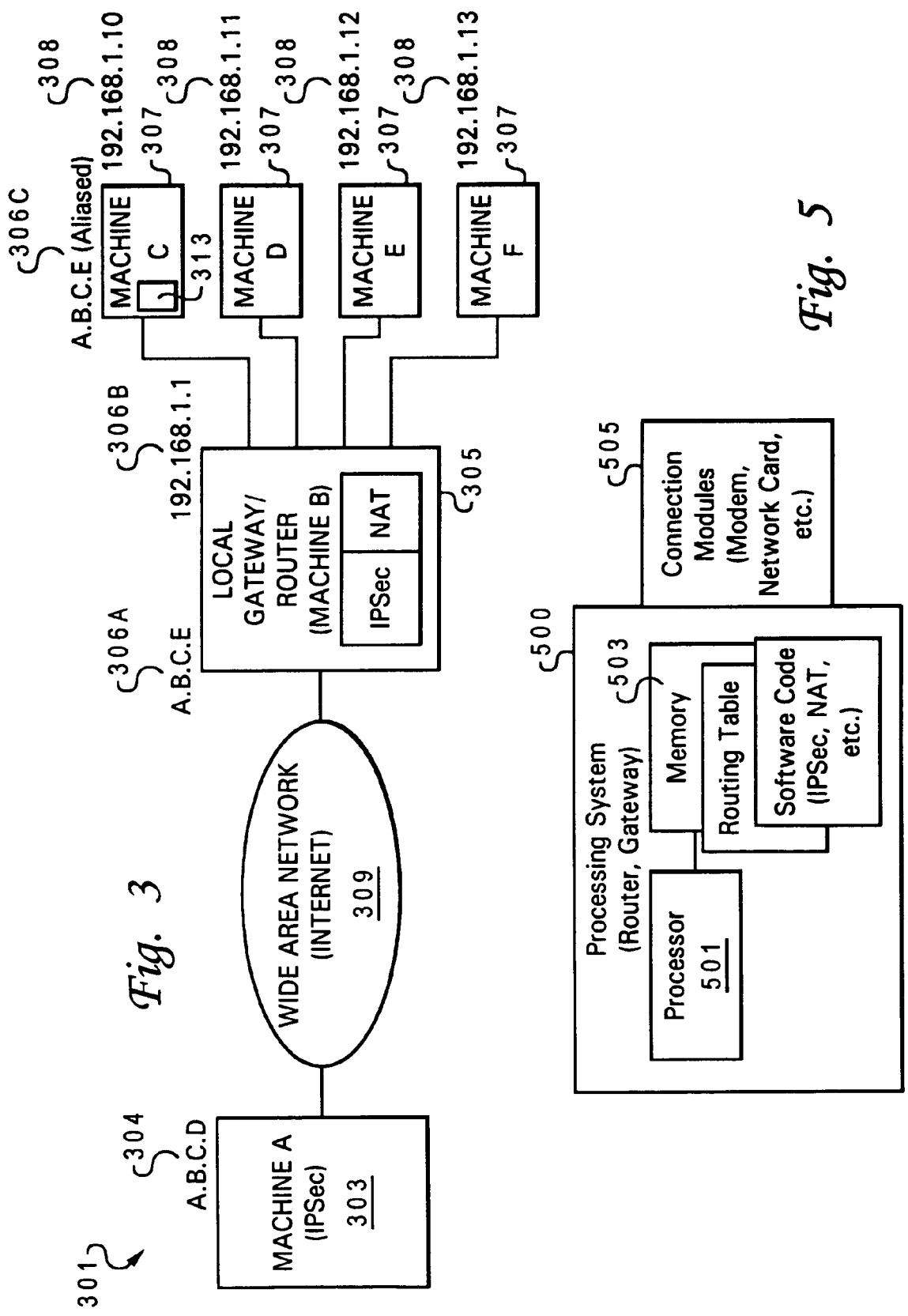

SECURE IPSEC TUNNELS WITH A BACKGROUND SYSTEM ACCESSIBLE VIA A GATEWAY IMPLEMENTING NAT

BACKGROUND OF THE INVENTION

1. Technical Field

The present invention relates generally to network communications and in particular to routing mechanisms for Internet communications. Still more particularly, the present invention relates to a method, system and program product for providing Network Address Translation within an Internet communication operating via IP security (IPsec) protocol.

2. Description of the Related Art

Network Address Translation (NAT) was developed in response to the declining number of available Internet Protocol (IP) addresses (currently maxed at less than 2^32) as more and more people are desiring to have access to the Internet. NAT is a method of connecting multiple computers (or machines) to the Internet (or any other IP network) using only one IP address. With the number of available IP addresses decreasing each day, the usage of NAT becomes not only desirable, but necessary.

With NAT, one machine is designated as a gateway/router. This machine will have a physical connection to the Internet. All the other machines are connected to this machine using private IP addresses. Private IP addresses are special IP addresses that are reserved for this purpose. These addresses are also called non-routable addresses as these addresses are not routed through Internet. Because of this, these addresses can be re-used as long as they are not directly connected to the Internet. The NAT gateway/router acts as a proxy to these addresses. The machines behind the NAT gateway will have private addresses and when communicating with the Internet, the machines send the data to the NAT gateway. The gateway performs the necessary address transaction to route the packet to the correct destination.

The gateway machines operate on the IP packet-level. NAT utilizes the gateway machine to manipulate the headers of IP traffic to provide packet routing between the internal machines of the local network and the Internet.

In addition to NAT, another development in IP technology is IP Security protocol (IPsec). IPsec is a security addition to the IP protocol that enables security and privacy to TCP/IP communication. IPsec is a suite of protocols that seamlessly integrates security features, such as authentication, integrity, and confidentiality, into IP. Using the IPsec protocols, an encrypted or authenticated path can be created between two peers (or Policy Enforcement Points). This path is referred to as a tunnel, and results in the creation of a virtual private network (VPN). Each peer is a device, such as a client, router, or firewall, that serves as an endpoint for the tunnel.

One common security mechanism utilized by IPsec is Internet Key Exchange (IKE), which is a set of procedures that IPsec-enabled devices utilize to transfer security keys required for encryption/decryption of the communication's content. Tunnels based on IKE are referred to as IKE tunnels. IPsec can be used in a gateway-to-gateway configuration or a client-to-gateway configuration or a combination of both. Traffic between the IPsec peers rides in a virtual "tunnel," which both verifies the authenticity of the sender and the receiver and encrypts all traffic. In gateway-to-gateway IPsec, the tunnel endpoints are the external (Internet-facing) interfaces of the virtual private network (VPN) gateways.

One drawback with IPsec is that it does not work within the NAT configuration, which is widely utilized on current IP networks. Conversely, although NAT works well for most network communication applications, NAT does not work well with communications established by the IPsec protocol.

IPsec encodes ID information (e.g., local and remote IDs—IP addresses, tunnel endpoints, etc.) in the packet during the IKE negotiation and data transfer. NAT manipulates the IP header addressing information which causes the IKE negotiation to fail.

For example, consider the network configuration of FIG. 1. The network comprises 3 machines, A, B, and C, two of which are linked via an external network connection (e.g., the Internet). Machine B operates as a gateway/router machine, which provides connectivity functions to the external network for other machines. Machine C is connected to machine B and communicates with the external network via machine B. Machine B performs the NAT operation for machine C. Machine B is configured to forward packets to machine C following the NAT operation.

According to current IP operation, machine A is only aware of machine B's IP address. IPsec encryption and authentication may be needed from machine A to machine C if a secure communication path is desired between both machines. As provided by FIG. 1, machine A has IP address A. B. C. D., wherein A. B. C. D. represents valid Internet address, as will be clear to those skilled in the computer arts and machine B has IP address A. B. C. E, which is also a valid Internet address. Machine C, however does not have a public/routable IP address because it is not directly connected to the Internet. Machine C has a private interface address, which in the illustrative example is 192.168.1.10. Machine C connects to the Internet through machine B using NAT. The second interface of machine B (i.e., the local interface seen by machine C) is illustrated with IP/interface address 192.168.1.1, which is within the subnet of machine C and hence can communicate directly with machine C.

FIG. 2 illustrates a sample packet transmitted via IPsec protocol. As shown, packet 201 includes header 203 and encrypted data portion 205. Header 203 contains the IP headers (i.e., destination and source addresses and ports), utilized by NAT to route packets. Encrypted data portion comprises the encrypted data, as well as the IPsec IDs (i.e., destination and source IP addresses and ports). Encrypted portion 205 of packet 201 is generated by IKE and IPsec protocol.

When an IKE tunnel is to be established between machines A and C, machine A defines the desired IKE tunnel with endpoints defined as A. B. C. D. (A) to A. B. C. E. (B). Machine A sends the IKE negotiation packet to machine B, which has local and remote IKE tunnel IDs as A. B. C. D. (A) and A. B. C. E. (B). This information is within the packet's data portion 205 and not in the header 203 and so machine B (the NAT router) is not able to change (or translate) it with NAT. Rather, machine B changes the source and destination addresses within the header to route the packet to machine C. When machine C receives the packet and looks at the IDs, machine C discovers that none of the IKE tunnel IDs matches its ID (interface address 192.168.1.10) and consequently machine C will fail the IKE negotiation.

Previously this problem was solved by terminating (i.e., defining the endpoints of) the IKE tunnel at the gateway or placing the IPsec module outside the NAT. Moving the tunnel end point to the gateway increases the tasks of the gateway and could create problems with thoughput. Further, the traffic inside the network will be readable/visible and this may pose a security risk. Lastly, compromising one service in the gateway could bring down all the services provided by the gateway.

Clearly, taking the IPsec authentication and other security features outside the NAT defeats the advantages of NAT and would require extra IP addresses to provide secure communication with local machines, such as machine C. However, there are no methods currently available that work with NAT without manipulating the IPsec software or modifying the IKE protocol itself.

The present invention therefore realizes that it would be desirable to provide a method and system for efficiently enabling secure IPsec tunnels within NAT without compromising security. A method and system that enables NAT to establish an IPsec communication with a correct local machine accessible via a gateway implementing NAT would be a welcomed improvement. These and other benefits are provided by the invention described herein.

SUMMARY OF THE INVENTION

Disclosed is a method and system for enabling secure IPsec tunnels within NAT without compromising security. Specifically, the method and system enables NAT to establish an IPsec communication with a correct local machine accessible via a gateway. A local network is configured with a gateway machine connected to the Internet and having an IPsec ID for interfacing with the Internet and a local IP/interface address for interfacing with the local network. The local IPsec machine is connected to the gateway machine and communicate with the Internet via the gateway and network address translation (NAT) techniques. The IPsec machine is configured with a local IP/interface address, within the subnet of the gateway's internal address, enabling it to connect to the Internet through the gateway using NAT. The IPsec machine is also provided with an alias of the external IP address for the gateway machine.

When an IPsec request is received by the gateway machine to establish a tunnel (secure communication), the gateway machine forwards the packet to the IPsec machine using NAT. The IPsec machine receives the request and checks its interface table to see if it has one of the IPsec IDs. Since it has an alias of the gateway's external IP address (the IPsec ID), the IPsec machine confirms that it has one of the IPsec IDs in the packet and sends the reply packet back to the gateway machine, which then forwards it back to the requesting machine over the Internet. The requesting machine receives the packet and continues the negotiation to obtain the necessary Security Associations. Thus, a secure connection is established. In this manner authentication of the IKE tunnel and establishment of a secure IPsec session is completed with a client machine that is accessible only via a gateway implementing NAT.

All objects, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

FIG. 1 is a block diagram representation of a basic network that implements NAT according to the prior art;

FIG. 2 illustrates a sample IPsec packet with header and IPsec addresses;

FIG. 3 is a block diagram representation of an IP network within which the features of the invention are advantageously implemented;

FIG. 5 is a block diagram of hardware and software components modules of a local network machine with which various functional features of the invention are implemented.

DETAILED DESCRIPTION OF AN ILLUSTRATIVE EMBODIMENT

Figure 4:
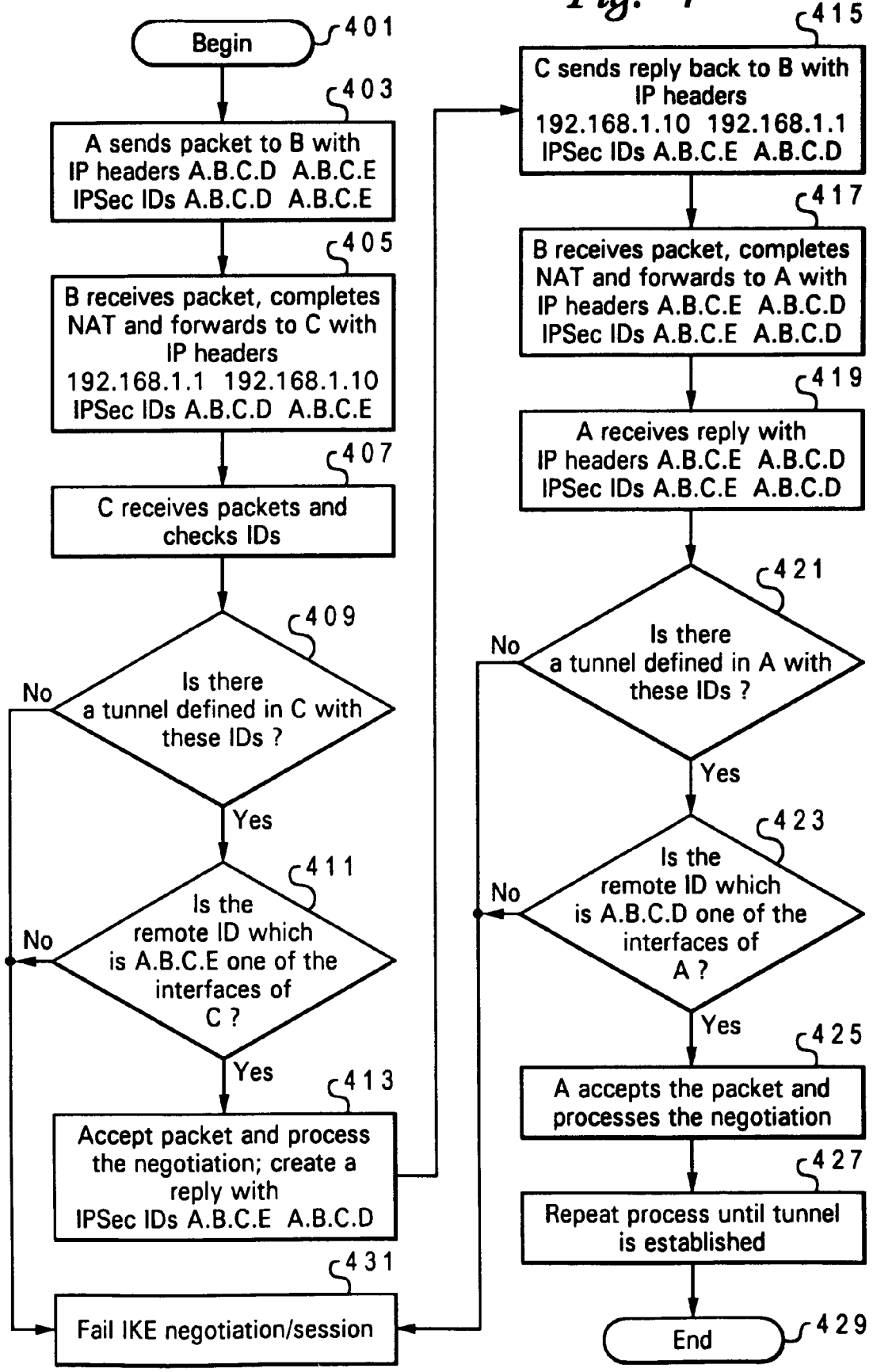
FIG. 4 is a flow chart depicting the process of authenticating an IPsec tunnel with a client/IPsec machine using a NAT gateway according to one embodiment of the invention.

Referring now to the figures, and in particular to FIG. 3, there is illustrated a block diagram of an IP network within which features of the invention may be implemented. IP network 301 comprises at least one remote machine (A) 303 connected to a local gateway 305, via a wide area network (WAN) 309, such as the Internet. For simplicity, all future references to the wide area network 309 will be referred to as Internet 309. Local gateway 305 operates as a router to secondary machines 307, which includes machine C though F and together form a local network 311. Each component within local network 311 has a unique IP/interface address 308 (and 306).

According to established IP protocol, local network 311 is viewed from Internet 309 as a single entity/system, having an IP address 306A of local gateway 305. Remote machine 303 also has an associated IP address 304. Notably, local gateway 305 has both internal network address 306B, which is within the subnet address 308. As illustrated, the local network machine (i.e., machine C) 307 also has an aliased address, which corresponds to IP address 306A of local gateway 305. This aliased address has a netmask of 255.255.255.255 and so this address will not participate in any routing decisions. According to the illustrative embodiment, only machine C 307 among local network machines 307 is capable of creating an IPsec tunnel with external remote machine 303. Thus, only machine C 307 has an aliased copy of the local gateway's IP address.

The various features of the invention are described with particular reference to IP network 301 and illustrated components. It is understood, however, that the specific description of IP network herein is provided for illustrative purposes only and not meant to be limiting on the invention. Other more complex (or even simpler) network configurations are possible and fall within the scope of the invention. Key to the invention, however, is that IP network 301, irrespective of its configuration, operates via IPsec protocol and has at least one attached system that operates as a gateway/router for a secondary machine. As utilized herein the word "machine" refers to any system that is connected to a network, can receive and transmit network level communication, and has an affiliated network address by which a communication path is directed. Machine may be utilized interchangeably with client, gateway, etc.

FIG. 5 illustrates major internal components of a machine, which may be either local gateway 305, client 307, or remote machine 303. However, for illustration, machine 500 is provided with a NAT module and is utilized as local gateway 305 within FIG. 3. The inventor illustrates NAT functions within machine 500; however, NAT function is not necessarily executed within machine 500. Other configurations by which NAT function may be completed are contemplated and fall within the scope of the invention. As shown, machine 500 comprises processing components (i.e., processor 501 and memory 503) and connectivity module 505 (such as modem or network card/LAN adapter). Connection to the network (both internal and external) is completed by connectivity module 505. Processing system components may be provided as a standard data processing system/computer. The NAT machine will have its ports forwarded for User Datagram Protocol (UDP) port 500, authentication header (AH), and encapsulated security payload (ESP) to the client 307. The NAT used could be any implementation of NAT which allows port forwarding and address translation.

When the machine 500 is used as the internal machine (client 307) the address translation software (NAT) may not be present in software. Machine 500 will have software for IKE authentication and tunnel setup as described below. The software coded algorithms that control the implementation of the various features of the invention are executed on processor 501. Machine 500 also comprises hardware and software components required to receive and transmit packets via IPsec protocol. Configuration changes are only necessary on the machine 307.

The invention provides a method and system for enabling secure IPsec tunnels within NAT without compromising security. Specifically, the method and system enables a machine residing behind a gateway with NAT to establish an IPsec communication with a correct local machine accessible via a gateway. A local network is configured with a gateway machine connected to the Internet and having a public (or external) IP address for interfacing with the Internet and a local IP/interface address for interfacing with the local network. Although many machines can be connected to the gateway, only one of these will be assigned to provide IPsec communication, assuming no load balancing is used. The machine communicates with the Internet via the gateway and network address translation (NAT) techniques. The machine is configured with a local IP/interface address, and is able to communicate with the Internet through the gateway using NAT. The internal machine also has an aliased address, which is the public or external address of the gateway. This address is aliased with the netmask of 255.255.255.255 and hence will not be used in routing decisions.

When an IPsec request is received by the gateway machine to establish a tunnel (secure communication) with one of the clients, the gateway machine forwards the packet to the internal machine using NAT. The internal machine receives the request and checks its interface table to see if it has one of the IPsec IDs. Since it has an alias of the gateway's external address, the machine receives the IPsec IDs packet, processes it and sends the reply packet and continues with the negotiation until the necessary Security Associations (SAs) are negotiated. Once the SAs are negotiated, the tunnel is established between the remote machine and the internal machine. This way, an IKE/IPsec tunnel and a secure session is established with an internal machine that is accessible only via a gateway implementing NAT.

Referring again to FIG. 3 and the example communication between the machines of FIG. 1. According to the invention, an aliased IP address is provided to machine C 307 during initialization/setup of machine C 307 on local network 311. The aliased IP address is created with the netmask of 255.255.255.255 applied to local gateway's 305 (machine B's) IP address A. B. C. E. Because the mask is 255.255.255.255, it is transparent and therefore will not affect the routing sequence. The address is aliased to the interface of machine C 307 that has the address of 192.168.1.10. The aliased address is stored within the router table 313 of machine C 307, for example.

In this example, when machine C 307 receives an IPsec packet from local gateway 305, machine C 307 will discover that one of its interfaces (i.e., aliased address 306C) matches the IPsec ID A. B. C. E. within the packet and so machine C 307 will continue the IKE negotiation (rather than fail the session).

Once the machine C 307 has processed the IKE message, machine C 307 is ready to send the response back to the originator of the message. The machine C 307 checks its routing table to find a path to remote machine (A) 303 (IPsec ID A. B. C. D. Since the mask 255.255.255.255 is utilized for the aliased address, the remote machine's IPsec IDs will not match any within the routing table 313. In fact, none of the paths/routes will match and so machine C 307 sends the packet to the default gateway 305. Gateway 305 captures the packet, completes a NAT, which changes the header address from the local/interface addresses to the Internet/IP addresses, and forwards the packet to remote machine A 303.

Remote machine A 303 will view the packet as coming from machine B and continue with the IKE negotiation. Once the negotiation is complete, the Security Associations (SAs) are created, indicating that a successful IKE tunnel is established. In one embodiment, the invention utilizes Linux "port forwarding" features to simulate the NAT function. Using Linux's NAT function with the features of the invention enables the facilitation of the negotiation of IPsec SAs and creation of IPsec tunnels.

FIG. 4 is a flow chart illustrating the process by which the IPsec protocol is extended to NAT. The process begins at block 401 and thereafter proceeds to block 403, which depicts a generation of an IPsec packet at machine A and transmitting to machine B. The packet is sent with a pair of IP headers and a pair of IPsec IDs, each pair affiliated with machines A and B. Thus, the IP address and IPsec ID for machine B is placed in the destination header and encapsulated within the packet, respectively, and the packet is sent to machine B to attempt to establish an IKE tunnel. Machine B receives the packet and completes the NAT before forwarding the packet to C. Machine B forwards the packet with translated IP headers 192.168.1.1 192.168.1.10, which are the internal/local network address of machines B and C, respectively as shown at block 405.

Machine C receives the packet and checks the IDs against those in its interface table as indicated at block 407. A determination is thus made, indicated at block 409, whether there is a tunnel defined in machine C with the ID sets of the packet (i.e., . . . D and . . . E). Then, if there is a tunnel defined within the machine, a next determination is made, as indicated at block 411, whether the remote ID (i.e., address A. B. C. E.) is one of the interfaces of machine C. If the remote ID is one of the interfaces, the packet is accepted and the negotiation is processed as shown at block 413. A reply is generated with IPsec IDs A. B. C. E. and A. B. C. D. The reply is sent back to B with reversed IP headers (i.e., 192.168.1.10 and 192.168.1.1) so that the packet goes from machine C to machine B as shown at block 415.

Machine B receives the packet and completes a NAT with these IP headers so that the IP headers now reflect IP address of machine B and machine A, respectively. This is indicated at block 417. Machine A receives the packet/reply with the IP and IPsec headers in reverse order from when it created the packet as shown at block 419. This complies with standard IPsec authentication procedures from machine A's viewpoint. To complete the authentication, however, a first determination is made, as indicated at block 421, whether there is a tunnel defined in machine A with the IDs in the packet. Then, a next determination is made, as shown at block 423, whether the remote ID (A. B. C. D.) is one of the interfaces of machine A. When both determinations yield positive results, machine A accepts the packet and processes the negotiation as shown at block 425. The process is then repeated until the tunnel is established as indicated at block 427, and then the process ends as shown at block 429. Notably, if any one of the determinations at block 409, 411, 421, and 423 results in a negative answer, the IKE negotiation is failed by the particular machine making the determination as indicated at block 431.

From the perspective of machine A, a secure/authenticated path has been created with machine C. All functional aspects of the invention are transparent to machine A. Notably the operation of the invention is also transparent to machine C. However, the authentication and security of the IPsec communication is maintained and a direct, secure tunnel is created from source to destination, albeit destination C.

As a final matter, it is important that while an illustrative embodiment of the present invention has been, and will continue to be, described in the context of a fully functional data processing system, those skilled in the art will appreciate that the software aspects of an illustrative embodiment of the present invention are capable of being distributed as a program product in a variety of forms, and that an illustrative embodiment of the present invention applies equally regardless of the particular type of signal bearing medium used to actually carry out the distribution. Examples of signal bearing media include recordable media such as floppy disks, hard disk drives, CD-ROMs, and transmission media such as digital and analog communication links.

Although the invention has been described with reference to specific embodiments, this description should not be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A system for providing IPsec authentication of a machine accessible via a gateway implementing network address translations (NAT), said system comprising:
    means for establishing an interface address of said machine corresponding to an IPsec identification (D) utilized to route an IPsec packet to said gateway;
    means for receiving an IPsec packet at said gateway;
    means for routing said received IPsec packet from said gateway to said machine; and
    means for completing said IPsec authentication of said machine utilizing said interface address, wherein an IKE tunnel is established between a sender of said packet and said machine via said gateway, wherein said means for completing said IPsec authentication includes:
        means for comparing a destination IPsec ID encoded within said received IPsec packet against a set of interface addresses associated with said machine within an IPsec/IKE database; and
        means, when said IPsec ID is found within the IPsec/IKE database, for generating a reply code within said received IPsec packet to create a modified IPsec packet.

2. The system of claim 1, wherein said interface address is an alias of an IP address of said gateway that is assigned to said machine to enable said machine to complete a receiving end of said IPsec authentication.

3. The system of claim 2, wherein said interface address is aliased with a constant value that enables said interface address to display similar characteristics and addressing functionality as said IP address of said gateway.

4. The system of claim 1, wherein said means for receiving receives said IPsec packet from said sender encoded with an IPsec ID of said gateway.

5. The system of claim 1, wherein said means for routing said received IPsec packet comprises:
    means for performing a NAT on said received IPsec packet, wherein a source address and a destination address within a header of said received IPsec packet are replaced by a local network address of said gateway and a local network address of said machine, respectively.

6. The system of claim 1, wherein said means for completing said IPsec authentication further includes:
    means for forwarding said modified IPsec packet to said gateway, wherein said gateway performs a reverse NAT on said source and destination addresses within said header of said packet and transmits said modified IPsec packet to said source.

7. The system of claim 6, wherein said source confirms said IKE authentication with said machine when said reply code is found within said modified IPsec packet and said source establishes an IKE tunnel with said machine via said gateway.

8. The system of claim 1, wherein said gateway and said machine are parts of a larger local network having additional machines, wherein only said machine is provided with said alias of said address and is able to create an IPsec tunnel.

9. The system of claim 1, wherein said NAT is provided by a standalone component associated with said gateway.

10. A method for establishing a secure IKE tunnel with a machine that is accessible to the Internet via a gateway performing network address translation (NAT), said method comprising:
    establishing an interface address of said machine corresponding to an IPsec identification (ID) utilized to route an IPsec packet to said gateway;
    receiving an IPsec packet at said gateway;
    routing said received IPsec packet from said gateway to said machine; and
    completing said IPsec authentication of said machine utilizing said interface address, wherein an IKE tunnel is established between a sender of said packet and said machine via said gateway, wherein further said completing of said IPsec authentication includes:
        comparing a destination IPsec ID encoded within said received IPsec packet against a set of interface addresses associated with said machine within an IPsec/IKE database; and
        when said IPsec ID is found within the IPsec/IKE database, generating a reply code within said received IPsec packet to create a modified IPsec packet.

11. The method of claim 10, wherein said interface address is an alias of an IP address of said gateway that is assigned to said machine to enable said machine to complete a receiving end of said IPsec authentication.

12. The method of claim 11, wherein said interface address is aliased with a constant value that enables said interface address to display similar characteristics and addressing functionality as said IP address of said gateway.

13. The method of claim 10, wherein said receiving step receives said IPsec packet from said sender encoded with an IPsec ID of said gateway.

14. The method of claim 10, wherein said routing of said received IPsec packet comprises:
performing a NAT on said received IPsec packet, wherein a source address and a destination address within a header of said received IPsec packet are replaced by a local network address of said gateway and a local network address of said machine, respectively.

15. The method of claim 10, wherein said completing said IPsec authentication further includes:
forwarding said modified IPsec packet to said gateway, wherein said gateway performs a reverse NAT on said source and destination addresses within said header of said packet and transmits said modified IPsec packet to said source.

16. The method of claim 15, wherein said source confirms said IKE authentication with said machine when said reply code is found within said modified IPsec packet and said source establishes an IKE tunnel with said machine via said gateway.

17. A local network comprising:
a plurality of client systems each having a corresponding network address, wherein one of said client systems comprises IPsec capabilities;
a gateway system by which said local network is coupled to an external network and that provides a communication path to said external network for said one client systems, wherein said gateway system enables addressing to and from said one client systems from/to said external network via network address translation (NAT);
wherein further said gateway system has an IP address by which it communicates with said external network and a local address for completing said NAT;
wherein said one client system comprises a local address for communicating within said local network and a mask of said IP address of said gateway; and
means for establishing a secure IKE tunnel between said one client system and a source on said external network via IPsec protocol utilizing said gateway system to bridge said IKE tunnel by NAT;
means for establishing an interface address of said one client system corresponding to an IPsec identification (ID) utilized to route an IPsec packet to said gateway system, said interface address being said mask address;
means for receiving an IPsec packet at said gateway system;
means for routing said received IPsec packet from said gateway to said one client system;
means for completing said IPsec authentication of said one client system utilizing said interface address, wherein an IKE tunnel is established between a sender of said packet and said one client system via said gateway system, wherein said means for establishing the secure IKE tunnel includes:
means for comparing a destination IPsec ID encoded within said IPsec packet against a set of interface addresses associated with said one client system; and
means, when said IPsec ID is found within the IPsec/IKE database, for generating a reply code within said IPsec packet to create a modified IPsec packet.

18. The network of claim 17, wherein said interface address is an alias of an IP address of said gateway system that is assigned to said one client system to enable said one client system to complete a receiving end of said IPsec authentication.

19. The network of claim 18, wherein said interface address is aliased with 255.255.255.255, which enables said interface address to display similar characteristics and addressing functionality as said IP address of said gateway system.

20. The network of claim 17, wherein said means for receiving receives said IPsec packet from said sender encoded with an IPsec ID of said gateway system.

21. The network of claim 17, wherein said means for routing said received IPsec packet comprises:
means for performing a NAT on said received IPsec packet, wherein a source address and a destination address within a header of said received IPsec packet are replaced by a local network address of said gateway and a local network address of said one client system, respectively.

22. The network of claim 17, wherein said means for completing said IPsec authentication further includes:
means for forwarding said modified IPsec packet to said gateway system, wherein said gateway system performs a reverse NAT on said source and destination addresses within said header of said packet and transmits said modified IPsec packet to said source.

23. The network of claim 22, wherein said source confirms said IKE authentication with said machine when said reply code is found within said modified IPsec packet and said source establishes an IKE tunnel with said one client system via said gateway.

24. The network of claim 17, wherein only said one client system is provided with said alias of said address and is able to create an IPsec tunnel.

25. The network of claim 17, wherein said NAT is provided by a standalone component associated with said gateway system.

* * * * *